Feb. 21, 1956 G. G. KEYES 2,735,885

TELEGRAPHICALLY CONTROLLED TIMING MECHANISM

Filed Nov. 3, 1952 3 Sheets-Sheet 1

INVENTOR
GEORGE G. KEYES
BY Emery Robinson
ATTORNEY

Feb. 21, 1956 G. G. KEYES 2,735,885

TELEGRAPHICALLY CONTROLLED TIMING MECHANISM

Filed Nov. 3, 1952 3 Sheets-Sheet 2

INVENTOR
GEORGE G. KEYES
BY Emery Robinson
ATTORNEY

Feb. 21, 1956

G. G. KEYES 2,735,885

TELEGRAPHICALLY CONTROLLED TIMING MECHANISM

Filed Nov. 3, 1952

3 Sheets-Sheet 3

INVENTOR
GEORGE G. KEYES
BY Emery Robinson
ATTORNEY 2,735,885
Patented Feb. 21, 1956

2,735,885

TELEGRAPHICALLY CONTROLLED TIMING MECHANISM

George G. Keyes, Chicago, Ill., assignor to Teletype Corporation, Chicago, Ill., a corporation of Delaware Application November 3, 1952, Serial No. 318,494

3 Claims. (Cl. 178—4)

This invention relates to systems of communication and more particularly to telegraph systems wherein a plurality of telegraph stations are connected in a telegraphic transmission path.

During normal transmission over a duplex line from the central station to any one of a plurality of subscriber's stations, it is at times desirable to ascertain which of said subscriber's stations wishes to transmit to the central station. The selection of stations is under the control of the central station which periodically interrupts message transmission therefrom, and in lieu thereof transmits over the duplex signal line a group of code signals identified as a transmitter start pattern, the significance of which is to initiate the operation of a remote subscriber's transmitter if it is in readiness for message transmission. After the ready station has had its transmitter connected into the line, the receiving printer at the subscriber's station is again automatically connected into the line to continue to receive the aforesaid interrupted message from the central station.

The principal object of the present invention is to provide means for controlling more effectively the selection of geographically separated telegraph tape transmitters over a duplex telegraph transmission path.

A feature of the invention resides in an arrangement in which each station, or the transmitter thereat, is given an opportunity to transmit the messages stored therein. That is, means is provided at a central or control station for periodically conditioning the timing apparatus at the respective stations selectively so that each station is periodically provided with an opportunity to transmit messages over the system, if ready when called.

Another feature resides in an arrangement for permitting the insertion of a tape in the tape controlled transmitter at the respective stations and condition the circuit so that at the next opportunity provided, the message will automatically be transmitted without any further attention or effort on the part of the attendant.

A further feature of the invention resides in providing in the control device at each outlying station, an answer-back device to provide for circuit assurance by apprising the central station that said outlying station is not ready to transmit, or has no message to transmit.

A still further feature of the invention is to provide a modification in the mechanical timer unit of the control unit to hold the receiving printers out of the circuit until a transmitter has been selected.

A more comprehensive understanding of the foregoing and other objects and features of the present invention may be had from the following description when taken in conjunction with the accompanying drawings, in which.

Figure 1:
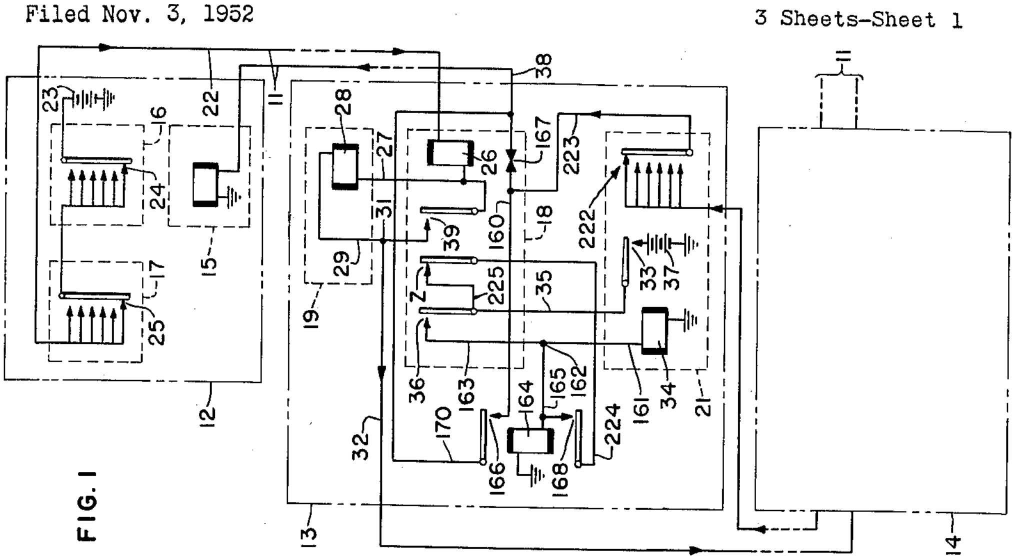
Fig. 1 is a schematic circuit diagram of the arrangement according to the present invention.

Having reference to Fig. 1, a two-way or duplex line 11 is indicated schematically with the central office 12 located at one end of the line. As may be readily appreciated by those skilled in the art, any suitable number of outlying stations may be connected to the system. The line 11 is provided with a receiving channel and a transmitting channel over which impulses may be simultaneously transmitted as is the usual practice with full duplex channels and well understood in the art. As shown in Fig. 1, the full duplex channel is illustrated by two full metallic one-way telegraph circuits. This has been done so that the invention may be more readily understood without the further complications of the various types of transmission systems commonly employed in telegraph networks for furnishing full duplex telegraph service between various stations and points. It is to be understood, however, that these lines or circuits may include any of the usual types of transmission circuits capable of providing this type of service. Since these transmission circuits operate in their usual and well-understood manner, they have not been described.

At the central office 12 are located a printer 15 which could be of the type shown in U. S. Patent No. 1,904,164, a tape transmitter 16 of the type disclosed in U. S. Patent No. 2,296,845, and an auxiliary transmitter 17 for transmitting the transmitter start pattern. With a number of stations connected on a duplex line (wherein messages may be transmitted in both directions simultaneously) and messages are sent from the central station selectively to any of the outlying stations on the circuit, it becomes desirable to permit transmission from any of the outlying stations to the central station. This latter transmission is controlled by the central station through the sending periodically therefrom of a series of groups of code signals identified herein as transmitter start patterns, the function of which is to start transmission from selected ones of said outlying stations in any predetermined sequence. A form of transmitter controller is disclosed in copending application, Serial No. 161,165 filed May 10, 1950, by W. J. Zenner, now U. S. Patent No. 2,667,533, dated January 26, 1955.

Located at each outlying station is a sequential control unit 18 of the type disclosed in U. S. Patent No. 2,502,654 issued April 4, 1950, to G. G. Keyes, modified by embodying therein the timing mechanism, shown in U. S. Patent No. 2,543,174 granted February 27, 1951, to G. G. Keyes et al. Said timing mechanism as will hereinafter appear, has been modified to include an answer-back device and to embrace further features as will be presently described. The sequential control unit 18 is arranged to receive all the impulses transmitted over the line and to respond selectively thereto. It controls the switching circuits in such a manner that the switching circuits are unresponsive during reception of message signals, but upon reception of a succession or sequence of certain preassigned signals they are activated or operatively connected to the selector circuit. Also located at the outlying station are a printer unit 19 and a tape transmitter unit 21. After having perforated the tape, the attendant at the outlying station 13 will insert the tape in the transmitter 21 thereat. At some time later the operator at the central switching station 12 will operate certain keys (not shown) to cause the transmitter 17 to transmit transmitter start pattern code signals over the duplex line 11 to cause the transmitter 21 at the outlying station 13 to be operatively associated with the transmission channel (or duplex line 11) and to start to transmit the signals recorded in the tape. It may be that the operator at the central station had previously conditioned a transmitter controller arrangement, such as disclosed in said copending application Serial No. 161,165, which will automatically cause the outlying transmitter to start transmission in rotation with the other similar transmitters at the outlying station.

It is assumed that transmission is already proceeding from central station 12 over the transmitting channel 22, which circuit extends from battery 23, through the contacts 24 of the message transmitter 16, then through contacts 25 of the auxiliary transmitter 17, then over channel 22, through the winding of selector magnet 26 of the sequential control unit 18, over conductor 27, through the winding of selector magnet 28 of the receiving printer 19, then over conductor 29 to junction 31, and over transmitting channel 32 through similar elements at successive outlying stations 14 to ground.

If the operator at station 13 desires to transmit a message to the central station 12, he prepares a tape preferably commencing with his station identity and inserts it in the tape transmitter 21, and in so doing a tape controlled contact 33 is closed to prepare a circuit for the start magnet 34 of the tape transmitter 21. This preparatory circuit extends from ground through the winding of start magnet 34, over the conductor 161 to junction 162, over conductor 163, through contact 36 (now open) in the sequential control unit 18, then over conductor 35, through tape-out contact 33 (now closed) and through battery 37 to ground. Also upon the closure of contact 33, a circuit is prepared for a relay 164 extending from ground, through the winding of relay 164, over conductor 165 to junction 162, then over conductor 163, through contact 36 (now open), over conductor 35, through tape-out contact 33 and through battery 37 to ground.

The purpose of relay 164 as will hereinafter appear, is two-fold. First, relay 164, through its contact 166, controls a short circuit for the answer-back contacts 167; and secondly, relay 164, through its contacts 168, controls a locking or sustaining circuit for relay 164 and start magnet 34. The contact 36 is closed in a manner hereinafter described to complete the circuit for the start magnet 34 and the relay 164, and to thereby initiate transmission from transmitter 21 over the channel 38 to the central station 12.

As previously mentioned, call signals are transmitted periodically from the central station 12 to "call in" any of the outlying station transmitters 21 in sequential order, and if such transmitter 21 is ready, it is given the opportunity to transmit the message stored in its tape. These "call in" signals are herein referred to as a transmitter start pattern and comprises a group of code signals which effect predetermined operations in the sequential control unit 18. As alluded to hereinbefore, the control unit 18 embodies a timing device which controls the timed operation of contacts 36 and 39. The contact 39 serves to shunt the printer selector magnet 28 so as to suppress printing on the recorder 19 while the "call in" signals of the transmitter start pattern are impressed on the line. The operation (closing) and locking of contact 36 functions to establish the energizing circuit for start magnet 34 of the transmitter 21 if contacts 33 have been closed upon insertion of tape in the transmitter, after which contact 39 is again opened so that messages may be again transmitted in both directions simultaneously over the duplex line.

The closure of contact 36, while contact 33 is closed, also establishes an energizing circuit for relay 164 over the previously described circuit, to close contact 166 to complete a shunt circuit for answer-back contacts 167. Thus, when message tape has been inserted in the transmitter 21 to effect transmission therefrom, the operation of answer-back contacts 167 will have no effect on the line due to the short circuit including contact 166 and conductors 160 and 170. However, if no message tape has been inserted in the transmitter 21 and contacts 33 consequently remain open, the relay 164 does not become energized and contact 166 is therefore open to preclude short circuiting of answer-back contacts 167. Then, the answer-back contacts 167, when operated as will hereinafter appear, will become effective to apprise the central station 12 that station 13 has no message to transmit.

Figure 4:
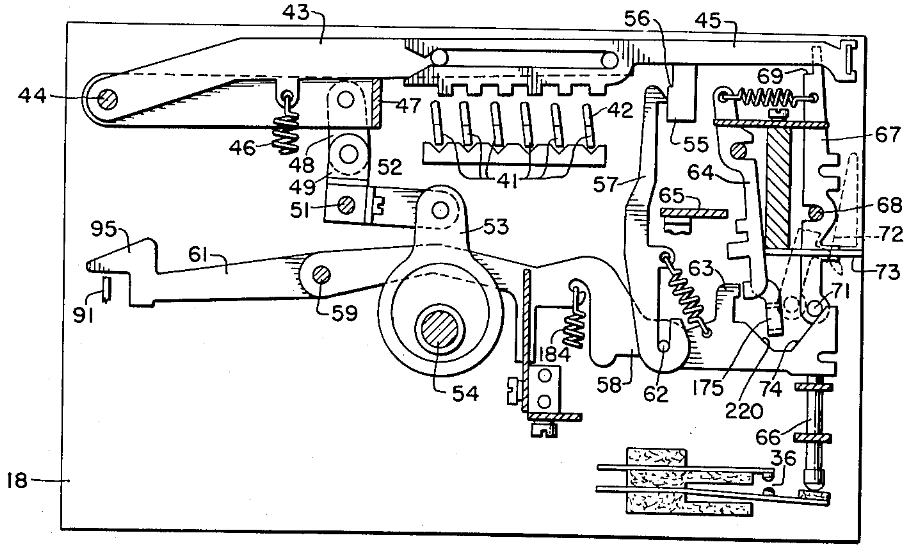
Fig. 4 is a cross-sectional view of the sequential control unit embodying the timing mechanism shown in Figs. 2 and 3.

Having reference to Fig. 4, the sequential control unit 18, which is of the type disclosed in said Patent No. 2,502,654, is provided with a series of five selector vanes 41 and a corresponding sixth vane 42. The vanes 41 are selectively rocked in accordance with the impulses of the five unit code, and the sixth vane 42 is rocked to its right or left position in response to predetermined code signals. A plurality of selector levers 43 are mounted pivotally on a pivot shaft 44. Levers 43 are each provided with a removably mounted notched or coded element 45. Furthermore, the levers 43 are biased clockwise by individual springs 46 against a bail member 47 also pivotally carried on shaft 44.

Bail 47 is adapted to be operated by a toggle mechanism comprising a link 48 connected between the bail 47 and a bracket 49 fixed to a shaft 51. Also fixed to the shaft 51 is a bracket 52, the outer end of which is connected to an eccentric drive means 53 carried on a shaft 54. During each rotation of shaft 54, the eccentric 53 will rock the shaft 51 to cause the bail 47 to be lowered to permit the code bars 45 to sense the selector vanes 41 to determine which bar 45 will be selected, the selected bar 45 being permitted to be rotated about shaft 44 a slightly greater amount.

Each of the levers 43 is provided with a depending portion 55 having a latching shoulder 56 thereon, so that the shoulder 56 of the selected lever 43 will engage the upper hooked end of a pull bar 57. When the bar 43 is returned to its upper position by the bail 47, the pull bar 57 will lift the bar 58 connected thereto. The bars 58 are individual to the pull bars 57 and are mounted pivotally on a pivot shaft 59. As will presently appear, certain of the bars 58 are provided with leftwardly extending portions 61. When a selected pull bar 57 is elevated, it functions through connection 62 to rotate its associated bar 58 counterclockwise about pivot shaft 59 until the bar 58, through projection 63, becomes latched in its raised position by a latch 64. Bar 58 and element 64 become unlatched by a bail 65, in the manner described in said Patent No. 2,296,845. The actuation and latching of bar 58 in this manner causes, through contact control element 66, the closing of contact 36 to complete the energizing circuit for the start magnet 34 of the transmitter 21 if certain other preliminary or prerequisite conditions hereinafter described are met.

Associated with each bar 58 is a blocking lever 67 mounted on a pivot rod 68. Levers 67 are provided at their upper extremities with a shoulder 69 which in one position of lever 67 functions to block selection of its associated selector bar 45. Levers 67 are provided at their lower extremities with a laterally directed stud 71 adapted to cooperate with the immediately adjacent one of the bars 58. In the operation of the sequential control unit 18, the prerequisite to effecting a sequential selection is to insert a gate instrumentality 72 in the bar 73 to unblock the first lever 67 in the sequence. Thus, upon the selection of the first bar 45 in the sequence, the bar 58 will be lifted, and through its cam surface 74 it will coact with stud 71 to rotate the adjacent lever 67 to unblock the second bar 45 in the sequence for selection. Under the final bar 58 in the series is placed the contact control element 66 which is operated to control a predetermined function.

As mentioned hereinbefore, the control unit 18 embodies a timing device which controls the timed operation of contacts 39. As viewed in Figs. 2 and 3, the timing unit comprises a shaft 75 which carries rotatably thereon through the instrumentality of a friction clutch (not shown) a sleeve 76. The shaft 75 derives its power through gears (not shown) from the main drive shaft 54, which in turn receives its power from a motor (not shown). Fixed to the sleeve 76 are a plurality of cams 77, 78, 79, 81, 82 and 83. Cam 77 has associated therewith a cam follower arm 84 (Fig. 2) which is an integral part of a bail member 85 mounted pivotally on a pivot shaft 86. A spring 87 normally urges the follower arm 84 against the periphery of cam 77.

The bail member 85 is also provided with a rearwardly extending arm having a laterally directed flange 88 which is provided with a slotted hole 89. A trip lever 91 is pivotally mounted on a pivot shaft 92, and is releasably articulated at its lower end to the flange 88. Lever 91 is provided with a slotted hole 93 and a spring 94 acts to urge the lever 91 both upwardly and in a counterclockwise direction. Cooperating with the upper end of the lever 91 is the rear portion 95 of a special bar 212, similar to bars 58. In the present embodiment of the invention this special bar 212 responds to the "blank" code signal, a gate 72 having been provided therefor to permit its selection.

Figure 2:
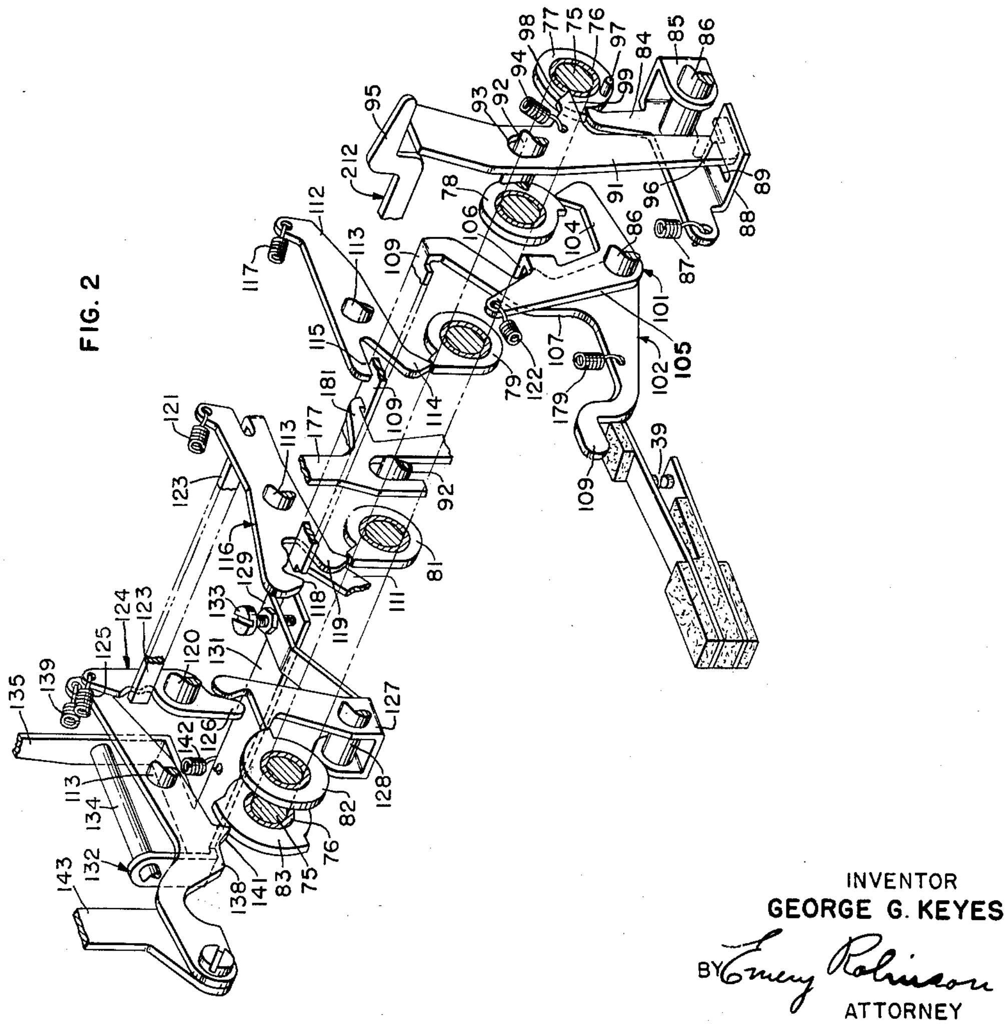
Fig. 2 is an expanded perspective view of the timing mechanism of the present invention.

Upon receipt of a "blank" code signal, the vanes 41 will assume a setting corresponding thereto, which will permit the selection of the "blank" selector bar (corresponding to bar 45). As previously described, this will cause the shoulder 56 to engage hook 57 to effect the raising of bar 212, similar to bar 58 (identified with the "blank" code) thereby rocking said special bar 212 in a counterclockwise direction (as viewed in Fig. 4) to lower the rear end 95 and depress the lever 91. As shown in Fig. 2, the notch 96 in lever 91 normally cooperates with the slot 89 to engage the bail 85 to impart a rocking motion thereto. Thus, in response to the receipt of the "blank" code signal, the lever 91 is depressed and the bail 85 is rocked counterclockwise to disengage the arm 84 from the cam 77 to initiate rotation of the cam sleeve 76. To insure a single cycle of rotation of sleeve 76 for each actuation of the bar 91, the cam 77 is provided with a stud 97 which cooperates with a cam surface 98 on a projection 99 on the lever 91. As the sleeve 76 nears the end of its cycle of rotation the stud 97 coacts with cam surface 98 to cam the lever 91 clockwise to disengage the notch 96 from the lateral projection 88 thereby permitting the spring 87 to return the arm 84 into engaging relation with the cam 77 independently of the return of lever 91 to its upward position.

Cam 78 is the operating cam for contact 39, which as previously described, is in the shunt circuit of printer magnet 28 (Fig. 1). Additional contacts may be associated with contact 39 to be operated concurrently therewith to control other operations or functions. Instead of controlling a shunt circuit for printer magnet 28, the contact 39 may directly open the electrical connection thereto, or it may exercise other control over the printer. The contact operating means for contact 39 comprises a bell crank lever portion 101 and a bail portion 102, both mounted pivotally on the pivot shaft 86. Portion 101 is provided with a cam follower arm 104 which cooperates with the periphery of the contact control cam 78. The vertical arm 105 of the portion 101 has a laterally directed projection 106 which normally bears against the vertical arm 107 of the portion 102. The horizontal arm of portion 102 cooperates with and operates the contacts 39. The distance X (Fig. 3) between the tip of the cam follower 104 and the drop-off in cam 78 is comensurate with the measured pause in the transmitter start pattern, as will hereinafter appear.

Integral with arm 107 at its upper end is the bail blade 109, which is also integrally connected with the upper end of the other arm 111 of portion 102. Arm 111 is also mounted pivotally on the pivot rod 86. A latch member 112 is pivotally mounted on a pivot rod 113 and is provided with a cam follower portion 114 which cooperates with the periphery of cam 79, and a latch portion 115 which cooperates with the bail blade 109 to hold the portion 102 in contact locking position. Member 112 is normally biased counterclockwise by a spring 117.

Also mounted pivotally on the pivot rod 113 is a blocking member 116 which is provided with a blocking portion 118 which cooperates with the bail blade 109, and a cam follower portion 119 which cooperates with the periphery of the cam 81. A spring 121 normally biases the member 116 in a counterclockwise direction. Portions 101 and 102 acting as a unit are normally urged counterclockwise by a spring 122. Member 116 is also provided with a laterally extending projection 123 which cooperates with a latch element 124 carried pivotally on the pivot rod 120. Latch 124 is normally biased counterclockwise into engagement with the projection 123 by a spring 125.

Latch member 124 is provided with a depending portion 126 which cooperates with a cam follower member 127 mounted pivotally on a pivot shaft 128. Member 127 cooperates with the periphery of cam 82 and is provided with a tail portion 129 which cooperates with an extension 131 of a selector cam sensing member 132. To provide adjustment between the cooperating extensions 129 and 131 an adjusting screw 133 is carried on the extension 129. The member 132 is pivotally mounted on a pivot shaft 134 and is provided with a vertical arm 135 which cooperates with the fourth selector cam 136 of the selecting cam barrel 137, which is comparable to the cam barrel 28 disclosed in the aforementioned Patent No. 2,502,654. As described in said patent, the cam barrel 137 derives its power from the main shaft 54. A spring 142 biases the member 132 to maintain arm 135 in cooperative relation with the cam barrel 137.

Figures 3, 5:
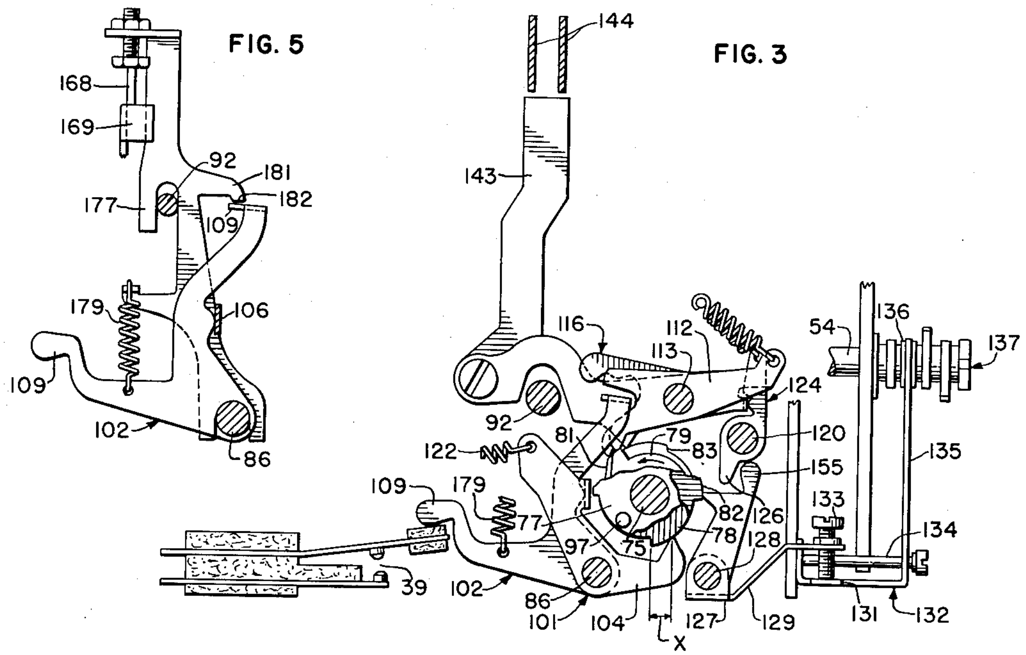
Fig. 3 is a cross-sectional view of the timing mechanism of the present invention.
Fig. 5 is a fragmental view of the printer shunt contact latch device according to the invention.

Also pivotally mounted on the pivot shaft 113 is a lever 138 which is normally biased counterclockwise by a spring 139 to maintain the cam follower projection 141 thereof in contactual engagement with the periphery of cam 83. Pivotally carried at the extremity of lever 138 is a vertically positioned bar 143 which functions under certain conditions of operation to block the selection of the "space" selector bar 144 (Fig. 3).

In the present embodiment of the invention there is provided an answer-back arrangement which provides circuit assurance in that it will require the reception at the switching unit at the central station of a "no traffic" or "not ready" response from any outlying station transmitter it has attempted to start, but which has no tape in it. This response by the outlying station to the transmitter start pattern, exemplified by either the H-answer-back signal or the transmission from message tape thereat assures the continuity of the outgoing and incoming lines of the switching system.

Figure 7:
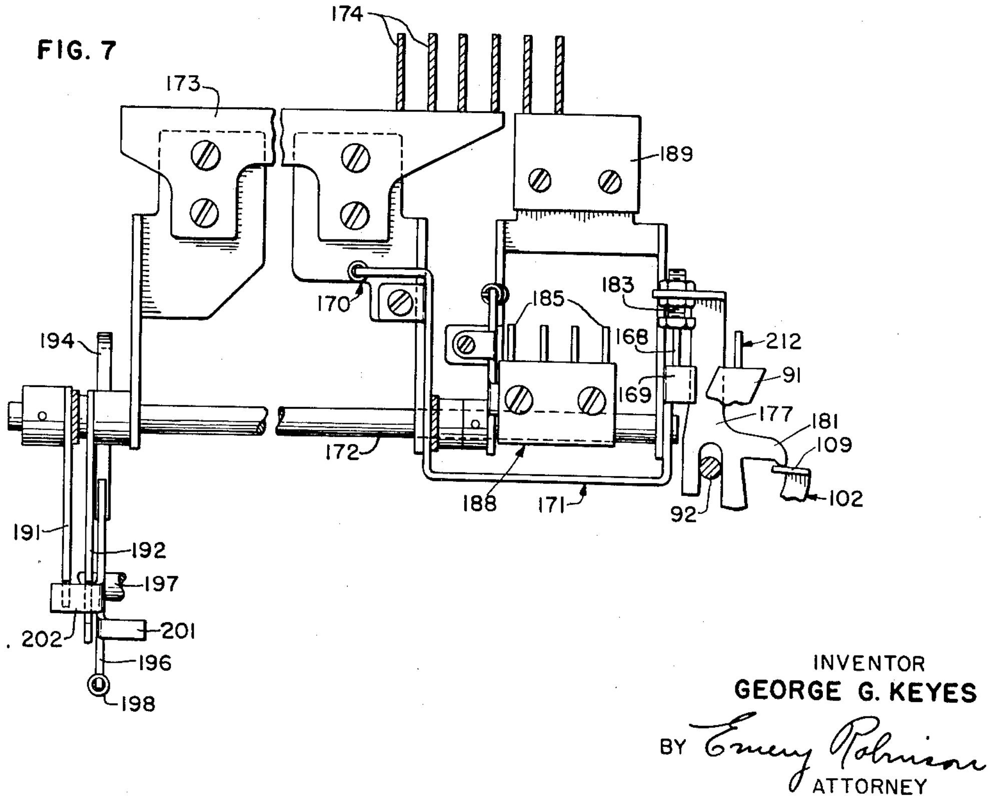
Fig. 7 is a rear elevational view of the sequential control unit embodying the timing and answer-back mechanisms.

Upon reception of the transmitter start pattern, the "blank" selector bar 45 is selected due to the fact that its blocking lever 67 has been ungated (moved to unblocking position) by the insertion of a gate 72; that is, the "blank" position of unit 18 is activated. Thus, the adjacent or "space" position is ungated upon the operation of the blocking bar 45 in the manner described in Patent No. 2,502,654. The "space" operating bar 168 associated with the selector bar 144 is provided with a rear portion corresponding to portion 95 which cooperates with a projection 169 of a bail 171 mounted pivotally on a shaft 172 (Fig. 7). Bail 171 is associated, through adjustable spring connection 170, with a blade 173 adapted to block certain of the selector bars 174 assigned to the selection of outlying station printers. This is done so that upon the selection of transmitters at the outlying stations, the outlying printers will not be affected.

Figure 8:
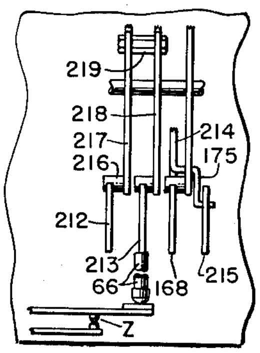
Fig. 8 is a fragmental front elevational view of the blocking lever arrangement.

Although the space selector bar 144 is normally blocked, it is observed that it is unblocked during the cycle of rotation of the timing mechanism which is approximately equal to three character cycles. Then, if no character signals are received during the measured pause (exemplified by the time interval X), the space signal which ensues will effect the selection of the operating bar 58 associated with the space signal. The "space" operating bar 168 (similar to operating bar 58) becomes latched in its counterclockwise position (as viewed in Fig. 4) by its latch 214 (Fig. 8). The latch 214 (analogous to latches 64) associated with the "space" operating bar is provided with a lower extending end 175 (comparable to portion 145 shown in Figs. 5 and 14 of U. S. Patent No. 2,502,654) which cooperates with its immediately successively operated and adjacent operating bar 215 which, in the present embodiment of the invention, is assigned to the "letters" code signal. Thus, once the operating bar 168 assigned to the "space" signal is operated, it becomes latched up by its latch 214, but instead of becoming unlatched during the instant cycle by the bail 65, it will instead remain latched up until said "letters" signal is received, which is not until all of the outlying stations have been tested for transmitters ready to transmit.

Therefore, upon receipt of the "space" signal a downward movement will be imparted to the rear end of the "space" operating lever 168 (Fig. 7) to thereby cause the bail blade 173 to be swung leftwardly as viewed in Fig. 6, into the dotted line position, below the depending projections 176 of the printer selection bars 174 of the group of bars 43. Pursuant to this condition of operation the selection of outlying station printers is prevented during the operation of transmitter selection in response to the transmitter start pattern.

As previously mentioned, the latch portion 115 of latch member 112 functions to hold the portion 102 in contact locking position to maintain the contact 39 in the printer shunt circuit closed. According to the arrangement disclosed in the aforementioned U. S. Patent 2,543,174, a transmitter start pattern was transmitted for the selection of each individual transmitter on the line. Therefore, only the latch 115 was required which held the contact 39 closed only for the duration of the individual transmitter start pattern. To save line time, the present invention contemplates a single transmitter start pattern to embrace, all of the transmitter stations on the line, thereby to test all said stations, if necessary, or until a ready transmitter is found.

To accomplish this result, a further latch means is provided which is associated with the "space" operating bar 168. Having reference to Figs. 3, 5 and 7, there is shown operably associated with the bar 168, a latch member 177 which is slidably supported and guided for vertical movement on shafts 86 and 92. Member 177 is normally spring biased in a downward direction by a spring 179, extended between member 177 and the horizontal arm of bell crank 102. Member 177 is provided with a sidewardly projecting arm 181 terminating in a latching shoulder 182 adapted to engage, under certain predetermined conditions of operations, the bail blade 109. Member 177 is also provided at its upper end with a laterally extending portion which carries therein an adjustable screw 183 which coacts with the bar 168 under the influence of spring 179. Thus, upon selection and operation of the space selector bar, the rear end of operating bar 168 is moved downwardly, so that the member 177 is permitted to follow. Then when the contact operating member 102 is rotated counterclockwise, as previously described, the bail 109 will become engaged by the latch 182 to hold the contact 39 closed.

The contact 39 will be maintained closed during the entire transmitter start pattern cycle (or until a ready transmitter is found) because, as previously mentioned, the bar 168 becomes latched in its operated position by its latch 214 and remains so latched until the "letters" code signal indicative of the end of the transmitter start pattern is received, whereupon the "letter" operating bar (adjacent to the space operating bar in the present instance) is operated to cooperate with the extension 175 to disengage latch 214 to permit the return of bar 168 to its normal position. Member 177 is therefore returned to its upward position (shown in Fig. 5) by the bar 168, because the spring 184 (Fig. 4) is stronger than spring 179 (Fig. 5).

As previously mentioned, it is at times desirable, during normal transmission over a duplex line to ascertain which of said subscriber's stations has a transmitter (of which there may be one or more at each outlying or subscriber's station) from which it is desired to transmit to the central station. As also mentioned, this selection of stations is under the control of the central station which periodically transmits over the duplex signal line a group of code signals identified as a transmitter start pattern, the significance of which is to initiate the operation of a remote subscriber transmitter if it is in readiness for message transmission. According to the present invention, the transmitter start pattern comprises a "blank" code signal, followed by a measured pause, then a "space" code signal, then a succession of transmitter start characters (preferably any alphabet characters) primarily equal in number to the number of transmitters in the line. However, the actual number of transmitter start characters transmitted from the central station during each transmitter start pattern cycle depends upon how many transmitter start characters have to be sent before finding a ready transmitter (that is, one having tape in it and prepared to transmit when called in). As will presently appear, each subscriber station is provided with an answer-back device which is initiated into effective operation when that subscriber station has no transmitter ready to transmit. The answer-back device is initiated into effective operation automatically when there is no message tape in the respective transmitter; thus, is indicative of "no traffic" from said transmitter.

The effect of the answer-back signal (which, for example, may be the character "H") at the central station is to cause said station to transmit the next transmitter start character. This procedure continues until a substation transmitter ready to transmit is found. When a subscriber's station transmitter is found which is ready to transmit and transmission is initiated therefrom the effect of said transmission is to cause the central station to transmit a "letters" code signal which causes the contacts 39 at all of the outlying or subscriber's stations to open, thus permitting the printers thereat to receive messages. The "letters" signal from the central station may be initiated and transmitted from an answer-back mechanism at the central station similar to that which will now be described in connection with the subscriber's station 13 (Fig. 1).

Figure 6:
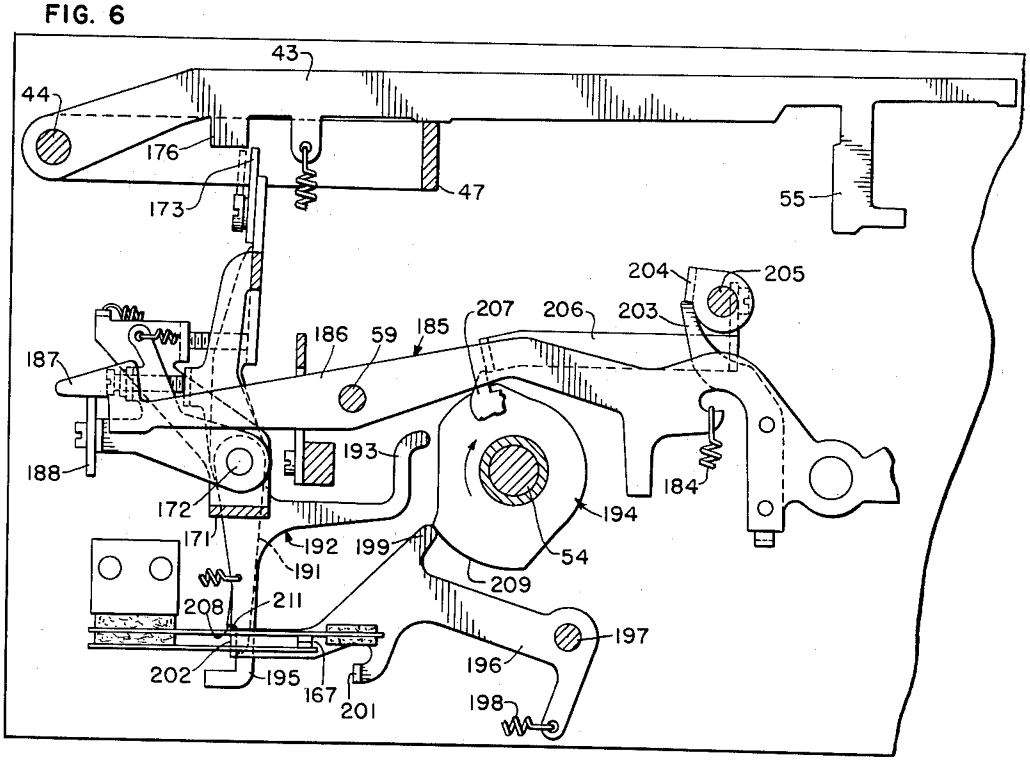
Fig. 6 is a cross-sectional view of the answer-back arrangement according to the invention.

Having reference to Figs. 6 and 7, certain of the operating bars 58 (Fig. 4) are assigned to selection of transmitters 21 at their respective outlying stations. Such bars are identified herein as bars 185 (Fig. 7), each of which is provided with a rearwardly directed extension 186 terminating in an offset portion 187 adapted to cooperate with a bail member 188 mounted pivotally on the shaft 172. Bail member 188 is fixed to shaft 172 for a purpose which will hereinafter appear. Also, bail member 188 is associated, through adjustable spring connection 190, with a bail blade 189 adapted to cooperate with depending portions (similar to portions 176) on their associated selector bars 43 in such a manner as to block or prevent, during the answer-back cycle, the selection of said bars 43, which are responsive to the transmitter start characters included in the transmitter start pattern. This restricts the selector bars 43 from reselecting on the second cycle, which eliminates a recycling condition, as will presently appear.

Fixedly pivoted on shaft 172 at the left end thereof, as viewed in Fig. 7, is a depending arm 191. Also, pivotally mounted freely on the shaft 172 is a bell crank member 192 comprising a cam follower arm 193 adapted to cooperate with the periphery of an answer-back cam 194 carried on the main operating shaft 54, and a depending arm 195. Cooperable also with the periphery of the answer-back cam 194 is a contact operating lever 196 mounted pivotally on a pivot shaft 197. Lever 196 is normally biased clockwise (as viewed in Fig. 6) by a spring 198. Lever 196 is provided with a cam follower portion 199 and a contact operating portion 201 for controlling a transmitting contact 167. Lever 196 is also provided with a latchable portion 202 cooperable with latch arms 191 and 192.

Fixed to each transmitter start character operating lever 185 is a yoke 203 which cooperates with a bail member 204 fixed to the clutch trip shaft 205 (comparable to clutch trip shaft 208 disclosed in aforementioned Patent No. 2,502,654). Also fixed to the shaft 205 is a clutch trip lever 206 which functions to release the clutch, exemplified by stop disc 207, identified with the answer-back cam 194.

The answer-back mechanism is illustrated in its normal stop position in Fig. 6. When a transmitter start character code signal is received, the operating bar 185 identified therewith is actuated counterclockwise, as viewed in Fig. 6, whereupon bail 188 is swung by end 187 to bring blade 189 into blocking relation with certain bars 43 identified with the transmitter start characters, and latch arm 191 (previously described as being fixed to shaft 172) is swung counterclockwise to bring its shoulder 208 out of latching engagement with portion 202 of contact control lever 196. Substantially simultaneously, the shaft 205 is rocked clockwise to disengage clutch release lever 206 from the stop disc 207 to permit a single rotation of shaft 54 and hence, the answer-back cam 194 thereon. However, shaft 54 rotates through a first cycle to effect the selection of the selector bar 185, and then through a second cycle to effect the transmission of the answer-back signal. To achieve this result, the selector bar 185 carries thereon the yoke member 203 which, when actuated upwardly by bar 185, acts upon bail member 204 to return the shaft 205 to its clockwise or clutch release position, whereby the clutch release lever 206 is held disengaged from disc 207. Now, when the main operating shaft 54, which has just rotated through one cycle in response to the normal reception of signal impulses, as described in said Patent No. 2,502,654 to effect the selection of a selector bar 185, is permitted to make another cyclic rotation to transmit the answer-back signal, the bars 174 are blocked to preclude a repeat selection of the same selector bar 174.

The answer-back contact 167, as is observed in Fig. 6, is normally in the closed or marking condition. Since the character "H" according to the Baudot code is marking in the third and fifth impulse intervals, the cam 194 is correspondingly contoured. Upon rotation of cam 194 in a clockwise direction, as viewed in Fig. 6, for the transmission of the answer-back signal, the dwell 209 of cam 194 acts through arm 193 to actuate the bell crank 192 counterclockwise to disengage the latching shoulder 211 thereof from said latch portion 202 of contact lever 196. Then, upon further clockwise rotation of cam 194 the signal cut on the periphery of cam 194 ("H" in the present illustration) will be transmitted, and the contact 167 will be opened and closed accordingly, terminating in a high portion which will allow the contact 167 to close, indicative of the stop condition.

If the transmitter 21 has tape inserted therein indicative of a "ready" condition, then the contact 33 is closed so that upon the closure of contact 36 by the operation of the operating bar 185 in response to the transmitter start character identified with this particular station the previously described circuits for magnet 34 and relay 164 are completed, whereupon the answer-back contact 167 is shunted by the closure of contact 166. A transmission circuit is accordingly established for transmitter 21 through its transmitting contacts 222, over conductors 223 and 160, through contact 166 (now closed), then over conductors 170 and 38 to the central station 12.

At the same time, locking circuits are established for relay 164 and magnet 34. The locking circuit for relay 164 extends from ground, through the winding of relay 164, then through contact 168 (now closed) or relay 164, over conductor 224, through contact Z (normally closed), over conductors 225 and 34, and through contact 33 to grounded battery 37. The locking circuit for start magnet 34 extends from ground, through the winding of magnet 34, over conductors 161 and 165, then through contact 168 (now closed), over conductor 224, through contact Z, over conductors 225 and 35, and through contact 33 to battery 37. Relay 164 and magnet 34 remain locked up during transmission from selected transmitters 21 until the "tape-out" or "end of message" contact 33 is opened, or until contact Z is opened, as will hereinafter be described.

As previously mentioned, the transmitter start pattern terminates with a "letters" code signal transmitted from the central station after all of the transmitter start characters have been sent, or following the start character of a subscriber's station that has been found "ready" to transmit. Referring to Figs. 4 and 8, the "blank" operating lever 212, the "Z" operating lever 213, the "space" operating lever 168, and the "letters" operating lever 215 (indicated in Fig. 8) are similar to the operating lever 58 shown in Fig. 4 and hereinbefore described. Thus, when the "blank" operating lever 212 (which has been ungated or conditioned for operation, as previously described) is operated the front end thereof is raised so that the cam portion 74 thereon acts upon pin 216 (comparable to pin 71) carried on blocking lever 217 (comparable to lever 67) to cause said lever 217 to unblock the "Z" selector lever 43. It is observed that the "Z" blocking lever 217 and the "space" blocking lever 218 are bridged together by a bridging member 219 (similar to bridging member 177 shown in Figs. 8 and 9 of said Patent No. 2,502,654) for a purpose hereinafter described. The bridging of blocking levers 217 and 218 conditions or unblocks both the "Z" and "space" selector levers so that either one of the latter may be selected following the "blank" code signal. Since we are now concerned only with the transmitter start pattern, it is remembered that the "space" signal follows the "blank" signal after a measured pause in the transmitter start pattern. Therefore, upon receipt of the "space" signal, the "space" operating bar 168 is raised, and becomes latched up by its latching lever 214 comparable to lever 64 (Fig. 4). At this point it is to be recalled that the latch lever 214 for operating bar 168 is not unlatched or released by the bail 65 (Fig. 4), but instead, is provided with the laterally extending portion 175 cooperable with the "letters" operating bar 215, so that when the "letters" code signal is received in due course after the transmission of transmitter start characters has concluded, the "letters" operating bar 215 is actuated to raise its front end to cause its cam surface 220 (Fig. 4) to effect the disengagement of latch lever 214 from the operating lever 168.

As previously described, the prerequisite to effecting a sequential selection is to insert a gate 72 in the bar 73 to unblock the first blocking lever or member 67 in the sequence. Having reference to Fig. 8, the first blocking lever in the sequence (herein called the pilot blocking lever) is the one (not shown) associated with the "blank" operating lever 212. With the arrangement shown in Fig. 8, wherein the blocking levers 217 and 218 are connected rigidly by the bridge 219, it will be observed that a two code signal sequence will select the pilot blocking lever and the selectable bar associated with the blocking lever 217, while another two code signal sequence will select the pilot blocking lever and the selectable bar associated with the blocking lever 218. Likewise, assuming that a greater number of blocking levers is bridged together to provide an integrally interconnected group of blocking bars, each different two code signal sequence will select the pilot blocking lever (common to said group) and any predetermined one of said interconnected blocking levers. Thus, by utilizing a pilot blocking lever and an integrally connected group of blocking levers, a novel arrangement is provided which reduces the number of selector bars required to achieve the same result as would be achieved by providing a pilot blocking lever individual to each two code signal sequence which would be necessitated without bridging.

*General operation*

As previously mentioned, it could be assumed that transmission is already proceeding from central station 12 over the transmitting channel 22. It is sometimes desirable, during normal transmission over a duplex line to ascertain which of said subscriber's stations wishes to transmit to the central station. As also mentioned, this selection of stations is under the control of the central station which periodically transmits over the duplex signal line a group of code signals, identified as a transmitter start pattern, the significance of which is to initiate the operation of a remote subscriber transmitter if it is in readiness for message transmission. The transmitter start pattern according to the present invention comprises a "blank" code signal, followed by a measured pause, then a "space" code signal, then a series of transmitter start characters (preferably alphabet characters), and finally a "letters" code signal. The measured pause is effected, by control means at the central station, by suppressing transmission of code signals for a predetermined period during which marking current is impressed on the line.

Upon receipt of the "blank" code signal, the "blank" selector bar (one of the bars 45) is selected to elevate the operating bar 58 associated therewith. This particular operating bar is provided with the tail portion 95 which, upon counterclockwise movement of bar 58 (as viewed in Fig. 4), acts to depress the bar 91 to cause the bail 85 to be rotated to disengage the arm 84 from the cam 77 thereby permitting the cam sleeve 76 to rotate through one cycle. It is well known that when the "blank" signal is received (as with any code signal), the selector cam drum 137 is initiated into rotation in response to the start impulse, and makes a single rotation, stopping in response to the stop impulse. Therefore, if no signal is received after the "blank" signal, the cam drum 137 will come to rest with the cam projection on the No. 4 selector cam 136 in position to maintain, through bail member 132, the member 127 in the position shown in Fig. 3.

As the cam sleeve 76 rotates (at a predetermined rate), the cam follower arm 104 will not drop off the high part of cam 78 until the distance X has been traversed. This distance traveled occurs during the "measured pause" interval, during which no code signals are received. If no signals are received during the "measured pause" interval, the follower arm 104 will drop off of the high part of cam 78 so that spring 122 will rotate the contact control lever 101—102 to close the contacts 39 to establish a shunt across the printer selector magnet 28 to prevent operation of the printer 19. In the meantime, the cam follower 114 has dropped off of the high part of the cam 79 to permit the latching portion 115 of the latch lever 112 to fall in back of the bail portion 109 to hold the contacts 39 closed during the remainder of the cycle of rotation of sleeve 76. To insure that the contacts 39 will remain closed even after the single cyclic rotation of sleeve 76, and while all of the outlying stations are being tested for transmitters ready to transmit in response to a single transmitter start pattern, as previously described, the latch slide 177 is provided.

At a time substantially equivalent to the "measured pause" interval, the follower 141 of lever 138 will drop off of the high part of cam 83 to retract the bar 143 from blocking relation with the "space" selecting bar 144 thereby permitting the "space" bar 144 to be selected. The selection of the "space" bar 144 has been prepared for in advance by inserting a gate 72 in front of the blocking lever 67 associated with the "blank" code bar 58 as previously mentioned and as described in said Patent No. 2,502,654. Therefore, when the space bar 144 is thus unblocked by the bar 143, the shoulder 56 thereof engages its associated hook lever 57 to effect the raising of the operating bar 58 so that the cam portion 74 thereof engages the stud 71 of the adjacent blocking lever 67 to swing said lever 67 clockwise out of blocking relation with its associated selecting bar 45 which responds to the character code signal assigned to the transmitter 21 of the subscriber's stations 13, 14, etc. from which it is desired to initiate transmission. This particular "space" bar is provided with a latch 64 having the aforementioned extension 175 (Figs. 4 and 8), so that the "space" operating lever will remain latched in its operated position until the "letters" code signal is received, as previously described. Furthermore, as previously noted, in response to this "space" signal, the bail 173 will be caused to block the printer selector bars 174.

As soon as the selecting bar 45 representative of the transmitter start character has been selected and its associated operating bar 185 has been operated, the tail portion 187 of said operated bar 185 will actuate bail 188 to cause bail blade 189 to block the transmitter start character selector bars so that the previously selected bar will not be reselected during the answer-back cycle. Moreover, the bail 188 and latch arm 191 are fixed to shaft 172 so that when the bail 188 is operated, the latch arm 191 will be swung out of blocking relation with the contact operating lever 196 in which position it will be maintained during the answer-back cycle. As previously described, the answer-back device will be released for a single cycle of rotation, causing early in the cycle the disengagement of shoulder 211 from the latch portion 202 of contact lever 196.

At the conclusion of transmission of the answer-back signal, the central station has been thus informed that this station has no tape inserted therein, indicating that this station has no message to transmit. The effect then of the answer-back signal is to cause the central station to transmit the next transmitter "call in" signal from transmitter 17. Upon transmission of the next transmitter start character, which, according to the present invention, is transmitted alone, without the repetition of the entire transmitter start pattern as was necessary in the arrangement disclosed in said Patent No. 2,543,174. Now, when a transmitter is found which has tape inserted therein to effect transmission, this condition is recognized by the central switching office, for example, by a device such as unit 18, which responds to a sequence of signals to control a "letters" answer-back device, and a "letters" code signal is transmitted on the other side of the line to the unit 18, the effect of which is, as previously described, to actuate lever 215 (Fig. 8) to cause the unlatching of latch 214 through extension 175. Thus, the contact 39 is again permitted to open to break the shunt circuit for selector magnet 28, so that transmission is again resumed to the receiving printers on the line until a new transmitter start pattern is impressed on the line.

As noted in Fig. 1, a contact Z is provided in the unit 18, the function of which is to permit interruption of transmission from a transmitter 21 to enable the central station to "call in" another outlying station in case of emergency or in the event tape is torn in the outlying transmitter. To achieve this result, a signal code sequence such as "blank," measured pause, "Z," is transmitted from central, the effect of which is to start the timing mechanisms in units 18 in response to the "blank" code signal, as already explained. Then, after the measured pause, instead of transmitting a "space" code signal (as in the case of a transmitter start pattern sequence), a "Z" code signal is sent, whereupon the "Z" operating lever 213 (Fig. 8) is actuated (due to the presence of bridging member 219 which permitted the simultaneous unblocking of both the "space" and "Z" selector bars 45 preparatory to the selection of either one of said bars depending upon whether the code sequence is "blank" — measured pause — "space" for transmitter selection, or "blank" —measured pause— "Z" for transmitter stop). The operation of the "Z" operating bar 213 causes the Z contact to be opened momentarily, whereupon the locking circuits for relay 164 and magnet 34 will be broken, and the contacts 166 and 168 of relay 164 will remain open. Transmitter 21 will accordingly stop transmitting while the central station proceeds to select the desired transmitter 21 through the instrumentality of selector levers 174 and to receive the emergency message therefrom. To restart the interrupted transmitter 21, a new transmitter start pattern is initiated from central to effect again the closing of contacts 36 and locking up of relay 164 and magnet 34, as previously described.

In the further practice of the invention, it may be desired to search the several outlying transmitters for messages of a predetermined priority, wherein it is not known by the central station which of the outlying stations has a message of said priority stored in its transmitter. In this event, the central station will transmit the "transmitter start" signal code sequence —"blank," measured pause, "space"— followed by the station identification character, to start the transmitter at said outlying station. In the event that the message thus received from said oulying station is not of the desired priority, this fact is recognized by the central station which then transmits a "transmitter stop" signal code sequence —"blank," measured pause, "Z"— to stop the transmitter at said outlying station. The central station then continues its search by sending alternate "transmitter start" and "transmitter stop" code sequences interspersed with single station identification characters until the desired priority message is found.

Although a specific embodiment of the invention has been shown in the drawings and described in the accompanying specification, it is understood that this invention is not limited thereto, but is capable of modification and rearrangement without departing from the spirit and scope of the invention.

What is claimed is:

1. In a telegraphically controlled timing mechanism for controlling the operations of a telegraph recorder and a storage transmitter associated therewith, a control magnet for said storage transmitter, an operating circuit for said control magnet, a first contact in said unit for conditioning said circuit for operation of said control magnet, a sequential control unit responsive to received groups of code signals, said groups including a pause of predetermined duration interposed between predetermined conditioning codes, a timing means included in said control unit, a second control contact in said unit operated momentarily for establishing said control circuit for the operation of said storage transmitter, a third control contact in said unit operated in timed manner by said timing means in response to said pause for shunting said recorder unit until transmission from said storage transmitter is established, a fourth contact connected in parallel with said second contact, and a locking relay means dually controlled by said second and fourth contacts and effective pursuant to the momentary operation of said second contact to establish a locking circuit for said storage transmitter control magnet, said fourth contact operated in response to predetermined code signals to interrupt transmission from said storage transmitter, whereby transmission of urgent messages from other transmitters is facilitated.

2. In a telegraphically controlled timing mechanism for controlling the operations of a telegraph recorder and a storage transmitter associated therewith, a control magnet for said storage transmitter, an operating circuit for said control magnet, a tape controlled contact in said unit for conditioning said circuit for operation of said control magnet in accordance with the condition of the tape, a sequential control unit responsive to received groups of code signals, said groups including a pause of predetermined duration interposed between predetermined conditioning codes, a timing means included in said control unit, a first control contact in said unit operated momentarily for establishing said control circuit for the operation of said storage transmitter, a second control contact in said unit operated in timed manner by said timing means in response to said pause for shunting said recorder unit until transmission from said storage transmitter is established, a third contact connected in parallel with said first contact, and a locking relay means dually controlled by said first and third contacts and effective pursuant to the momentary operation of said first contact to establish a locking circuit for said storage transmitter control magnet, said third contact operated in response to predetermined code signals to interrupt transmission from said storage transmitter, whereby transmission of urgent messages from other transmitters is facilitated.

3. In a telegraphically controlled timing mechanism for controlling the operations of a telegraph recorder and a storage transmitter associated therewith, a control magnet for said storage transmitter, an operating circuit for said control magnet, a tape controlled contact in said unit for conditioning said circuit for operation of said control magnet in accordance with the condition of the tape, a sequential control unit responsive to received groups of code signals, said groups including a pause of predetermined duration interposed between predetermined conditioning codes, a timing means included in said control unit, answer-back means in said control unit comprising an answer-back contact, a first control contact in said unit operated momentarily for establishing said control circuit for the operation of said storage transmitter, a second control contact in said unit operated in timed manner by said timing means in response to said pause for shunting said recorder unit until transmission from said storage transmitter is established, a third contact connected in parallel with said first contact, and a locking relay means dually controlled by said first and third contacts and effective pursuant to the momentary operation of said first contact to establish simultaneously a locking circuit for said storage transmitter control magnet and a shunting circuit for said answer-back contacts, whereby transmission of answer-back signals from said answer-back means and message signals from said storage transmitter are precluded to facilitate transmission of urgent messages from other transmitters.

References Cited in the file of this patent

UNITED STATES PATENTS

| | | |
|---|---|---|
| 1,632,106 | Zogbaum | June 14, 1927 |
| 1,980,284 | Morton et al. | Nov. 13, 1934 |
| 2,115,185 | Weber | Apr. 26, 1938 |
| 2,147,249 | Franklin | Feb. 14, 1939 |
| 2,511,832 | Agnew | June 20, 1950 |
| 2,543,174 | Keyes et al. | Feb. 27, 1951 |